(12) United States Patent
Weber et al.

(10) Patent No.: US 9,004,960 B2
(45) Date of Patent: Apr. 14, 2015

(54) CONNECTOR WITH GOLD-PALLADIUM PLATED CONTACTS

(71) Applicant: Apple Inc., Cupertino, CA (US)

(72) Inventors: Douglas J. Weber, Arcadia, CA (US); Naoto Matsuyuki, Nagoya (JP); Eric S. Jol, San Jose, CA (US)

(73) Assignee: Apple Inc., Cupertino, CA (US)

( * ) Notice: Subject to any disclaimer, the term of this patent is extended or adjusted under 35 U.S.C. 154(b) by 15 days.

(21) Appl. No.: 13/772,755

(22) Filed: Feb. 21, 2013

(65) Prior Publication Data

US 2014/0045352 A1 Feb. 13, 2014

Related U.S. Application Data

(60) Provisional application No. 61/682,078, filed on Aug. 10, 2012.

(51) Int. Cl.
| | |
|---|---|
| H01R 13/02 | (2006.01) |
| H01R 13/03 | (2006.01) |
| H01R 24/20 | (2011.01) |
| H01R 43/20 | (2006.01) |
| B32B 15/01 | (2006.01) |
| C25D 3/62 | (2006.01) |
| C22C 5/00 | (2006.01) |
| C22C 5/02 | (2006.01) |
| H01R 43/16 | (2006.01) |

(Continued)

(52) U.S. Cl.
CPC ............... *H01R 13/03* (2013.01); *H01R 24/20* (2013.01); *H01R 43/205* (2013.01); *B32B 15/018* (2013.01); *C25D 3/62* (2013.01); *C22C 5/00* (2013.01); *C22C 5/02* (2013.01); *H01R 43/16* (2013.01); *C25D 5/12* (2013.01); *C25D 7/00* (2013.01); *C23C 18/1653* (2013.01)

(58) Field of Classification Search
USPC ........................................ 439/78, 884–890
See application file for complete search history.

(56) References Cited

U.S. PATENT DOCUMENTS

| | | | |
|---|---|---|---|
| 3,090,733 | A | 5/1963 | Henry |
| 3,288,574 | A | 11/1966 | Du et al. |

(Continued)

FOREIGN PATENT DOCUMENTS

| | | |
|---|---|---|
| DE | 4013627 A1 | 10/1991 |
| DE | 19809961 A1 | 9/1999 |

(Continued)

OTHER PUBLICATIONS

Notice of Allowance for U.S. Appl. No. 13/250,920, mailed Sep. 13, 2013, 12 pages.

(Continued)

*Primary Examiner* — Chandrika Prasad
(74) *Attorney, Agent, or Firm* — Kilpatrick Townsend & Stockton LLP

(57) ABSTRACT

An improved outer layer of plating comprising a binary metal alloy of gold and palladium is employed on connector contacts. The binary metal alloy is plated on at least the contact surface of the contacts. Intermediate plating layers can be applied between the outer layer of gold and palladium and the conductive base of the contacts. The binary metal alloy of gold and palladium may be configured to have a mostly gold or a mostly silver appearance, depending upon the relative concentration of gold and palladium in the binary metal alloy.

22 Claims, 7 Drawing Sheets

(51) Int. Cl.
*C25D 5/12* (2006.01)
*C25D 7/00* (2006.01)
*C23C 18/16* (2006.01)

(56) References Cited

U.S. PATENT DOCUMENTS

| | | | |
|---|---|---|---|
| 3,354,059 A | 11/1967 | Koretzky | |
| 3,355,267 A | 11/1967 | Du | |
| 3,367,854 A | 2/1968 | Frank | |
| 3,528,894 A | 9/1970 | Stoddard et al. | |
| 3,806,429 A | 4/1974 | Clauss et al. | |
| 3,812,566 A | 5/1974 | Clauss | |
| 3,878,067 A | 4/1975 | Tremmel | |
| 3,974,044 A | 8/1976 | Tremmel | |
| 3,994,694 A | 11/1976 | Clauss et al. | |
| 4,002,543 A | 1/1977 | Clauss et al. | |
| 4,069,370 A * | 1/1978 | Harmsen et al. | 428/671 |
| 4,089,754 A | 5/1978 | Tremmel et al. | |
| 4,179,343 A | 12/1979 | Tremmel | |
| 4,339,644 A * | 7/1982 | Aldinger et al. | 200/266 |
| 4,891,480 A | 1/1990 | Holden et al. | |
| 5,108,317 A | 4/1992 | Beinhaur et al. | |
| 5,980,324 A | 11/1999 | Berg et al. | |
| 7,015,406 B2 * | 3/2006 | Ganz et al. | 200/269 |
| 8,637,165 B2 | 1/2014 | Siahaan et al. | |
| 8,673,213 B2 * | 3/2014 | Augstein et al. | 422/82.01 |
| 8,708,745 B2 * | 4/2014 | Golko et al. | 439/607.41 |
| 2002/0187688 A1 | 12/2002 | Marvin et al. | |
| 2004/0238338 A1 | 12/2004 | Ganz et al. | |
| 2005/0196634 A1 | 9/2005 | Abe et al. | |
| 2007/0202007 A1 * | 8/2007 | Augstein et al. | 422/56 |
| 2009/0317556 A1 | 12/2009 | Macary | |
| 2013/0084760 A1 | 4/2013 | Siahaan et al. | |
| 2013/0115821 A1 * | 5/2013 | Golko et al. | 439/638 |

FOREIGN PATENT DOCUMENTS

| | | |
|---|---|---|
| JP | 55108757 A | 8/1980 |
| JP | 55119142 A | 9/1980 |
| JP | 1109756 A | 4/1989 |
| JP | 4255259 A | 9/1992 |
| JP | H08298038 A | 11/1996 |
| JP | 2010044983 A | 2/2010 |

OTHER PUBLICATIONS

Partial International Search Report for International PCT Application No. PCT/US2013/035840, mailed on Sep. 24, 2013, 7 pages.

International Search Report and Written Opinion for International PCT Application No. PCT/US2013/035840, mailed on Nov. 29, 2013, 17 pages.

* cited by examiner

CONNECTOR WITH GOLD-PALLADIUM PLATED CONTACTS

PRIORITY

This application claims the benefit of U.S. Provisional Patent Application No. 61/682,078, filed Aug. 10, 2012 which is incorporated herein by reference in its entirety and for all purposes.

FIELD OF THE INVENTION

The present invention relates generally to electrical connectors and in particular to plated electrical connector contacts.

BACKGROUND OF THE INVENTION

A wide variety of electronic devices are available for consumers today. Many of these devices have connectors that that facilitate communication with and/or charging of a corresponding device. These connectors often interface with other connectors through cables that are used to connect devices to one another. Sometimes, connectors are used without a cable to directly connect the device to another device, such as a charging station or a sound system.

As smart-phones, media players and other electronic devices become more compact, their corresponding connectors play a greater role in the ultimate market success of the device. For example, in many nano-scale MP3 players and compact flash storage devices, the connectors actually dominate the physical geometry, the aesthetics and sometimes the cost of the electronic device.

One of the most critical components of a connector are the contacts. The contacts are the portions of the connector that physically touch each other and are responsible for conducting the electrical signals between the mated connectors. Not only must these contacts survive sometimes thousands of mates and de-mates, they must also withstand the rigors of today's consumer, remaining with them throughout the day as they travel in and out of fitness centers, kitchens, offices, factories, automobiles, and many other places. Many of these locations provide opportunities for exposure to chemicals that pose little or no risk to the consumer, but present a harsh environment for the connector contacts. For example, connectors regularly come into contact with food, sweat, and other elements that corrode the materials that make up the connector contacts.

Connector contacts are often made primarily of copper alloys, due to the advantageous electrical properties of copper. However, copper alloys are highly susceptible to corrosion so the contacts are often covered with an outer layer of corrosion and oxidation resistant metal. One of the most common outer layers employed is gold because of its high electrical conductivity and resistance to corrosion and oxidation. While gold is an effective contact coating in many applications, alternatives to gold are desirable.

BRIEF SUMMARY OF THE INVENTION

The present invention relates to contacts that are plated with a metal alloy of gold (Au) and palladium (Pd) instead of pure gold. The contacts can be used, for example, as wiping contacts and are configured for repeated use in multiple thousands of mating cycles. By way of example, the contacts may be used on data and/or power connectors, such as USB connectors, Firewire connectors, Thunderbolt connectors, the Apple Lightning connector and the like. The plated material offers the benefits of typical gold plated performance but with an aesthetic effect of appearing silver in color, rather than gold. This aesthetic benefit is particularly useful when the contacts are external contacts in an electrical connector where such a silver coloring is valued.

In one embodiment, the binary metal alloy of gold and palladium comprises least 10 percent by weight of palladium, with the remainder in gold. This alloy may exhibit a color that is more silver than pure gold. In some embodiments the percent by weight of palladium in the binary metal alloy is between 15 to 50 percent, with the remainder in gold. Compositions that are greater approximately 15 percent by weight of palladium may exhibit a color that is uniformly silver with little or no noticeable gold color.

In one embodiment, the gold/palladium (Au/Pd) binary metal alloy outer layer has a thickness of at least 0.3 microns with the concentration of palladium and gold being substantially constant throughout the thickness of the layer. In some embodiments the Au/Pd layer has a thickness of between 0.2-2.0 microns. The binary metal Au/Pd alloy layer can be made from highly pure gold and palladium. In some embodiments, the Au/Pd metal alloy is at least 99 percent pure with 1 percent or less of other elements. In some embodiments, the Au/Pd metal alloy is at least 99.9 percent pure with 0.1 percent or less of other elements, and in still other embodiments the Au/Pd metal alloy is at least 99.99 percent pure with 0.01 percent or less of other elements.

In some embodiments one or more intermediate plating layers are formed between a conductive base of the contact, for example a copper base or a stainless steel base, and the Au/Pd surface plating to promote adhesion of the layers. Each of the one or more intermediate layers can be referred to as a strike layer. In one embodiment the invention includes a strike layer of predominantly nickel that may be, for example, between 0.05-0.15 microns thick. In another embodiment, the invention includes a thin gold strike layer (e.g., 0.005-0.015 microns thick) formed over a thicker nickel strike layer (e.g., 0.05-0.15 microns thick). In still another embodiment, the strike layer comprises multiple layers of nickel.

To better understand the nature and advantages of the present invention, reference should be made to the following description and the accompanying figures. It is to be understood, however, that each of the figures is provided for the purpose of illustration only and is not intended as a definition of the limits of the scope of the present invention.

DETAILED DESCRIPTION OF THE INVENTION

Figure 1:
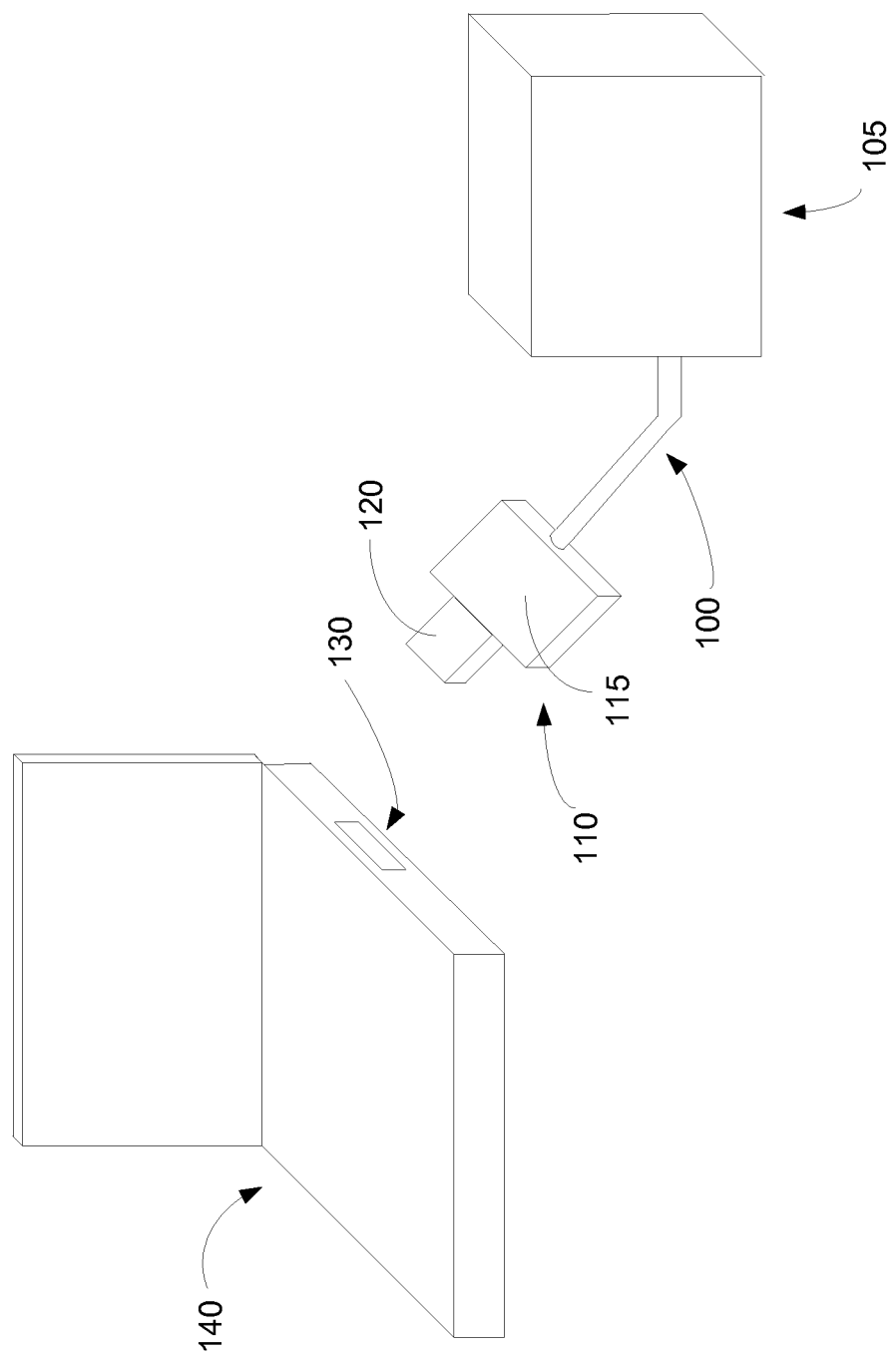
FIG. 1 is a diagram that illustrates an example two devices that can be interconnected with a cable, a connector plug and a connector receptacle.

Many electronic devices such as smart-phones, media players, and tablet computers have connectors that facilitate battery charging and/or communication with other devices. The connectors include a plurality of electrical contacts through which electrical connections are made to another compatible connector to transfer power and/or data signals through the connectors. FIG. 1 illustrates an example of two such connectors including a plug connector 110 and a receptacle connector 130. Each of connectors 110 and 130 can comply with a well-known standard such as USB 2.0, Firewire, Thunderbolt, or the like or may be proprietary connectors, such as the 30-pin connector used on many Apple products among other types of proprietary connectors.

As shown in FIG. 1, plug connector 110 is coupled to a cable 100, which in turn is coupled to a peripheral device 105 that can be any of many different electronic devices or accessories that operate with such devices. Receptacle connector 130 is incorporated into a computing device 140. When plug connector 110 is mated with receptacle 140, contacts within each connector (not shown in FIG. 1) are in physical and electrical contact with each other to allow electrical signals to be transferred between computing device 140 and peripheral device 105. Embodiments of the invention may be used as any or all of contacts in each of connectors 110 and 130. To further illustrate embodiments of the invention, various examples of connectors that include contacts that may be made in accordance with the present invention are discussed below.

Figure 2:
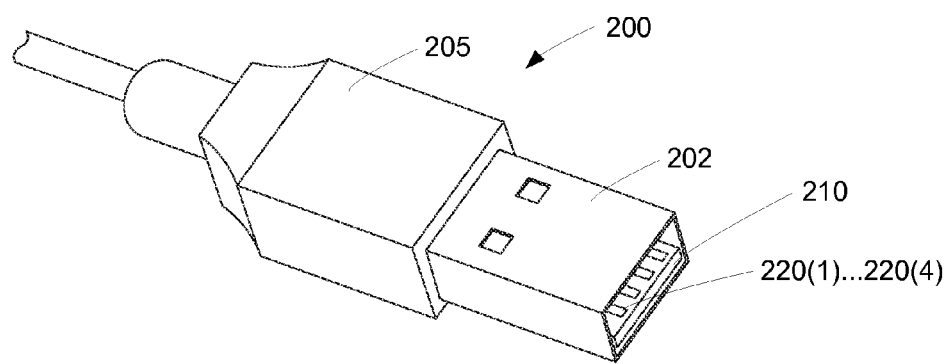
FIG. 2 is a diagram that illustrates an example of a connector plug with internal contacts.
Figure 3:
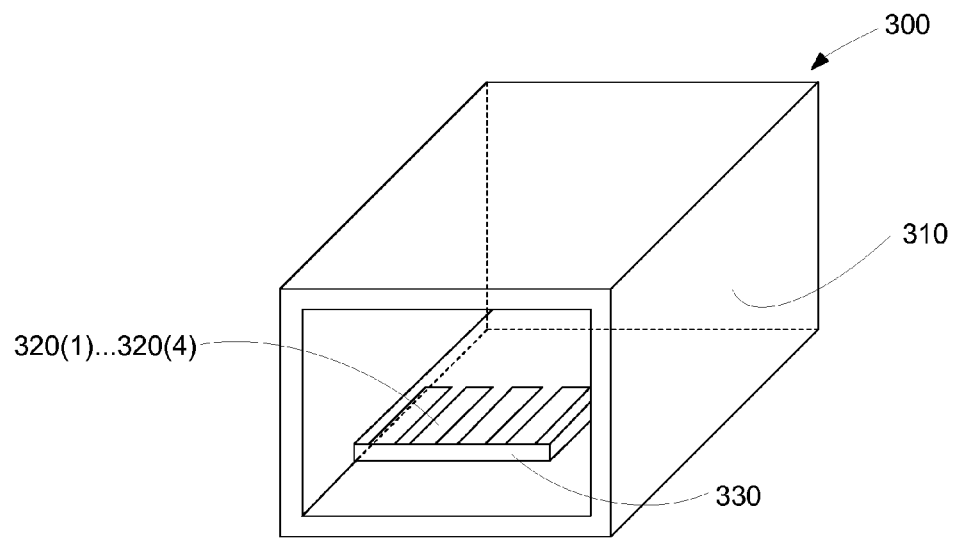
FIG. 3 is a diagram that illustrates an example of a connector receptacle with internal contacts.

As a first example, reference is made to FIGS. 2 and 3, which depict simplified views of USB plug and receptacle connectors, respectively. FIG. 2 illustrates an example of a USB plug connector 200 that can be used as connector 110 shown in FIG. 1. Connector 200 has a metallic shield 202 that forms a cavity in which a plurality of contacts 220(1) . . . 220(4) are disposed on a contact retainer 210. The connector plug also has a body 205 that may be, for example, manufactured from plastic or another nonconductive material. Because contacts 220(1) . . . 220(4) of connector 200 are within shell 202, the contacts can be referred to internal contacts as opposed to external contacts.

FIG. 3 illustrates an example of a USB receptacle connector 300 that is designed to mate with the plug connector 200. The connector receptacle includes of a metallic shield 310 that forms a cavity in which a plurality of internal contacts 320(1) . . . 320(4) are attached to a contact retainer 330. Embodiments of the invention may be used as any or all of internal contacts 220(1) . . . 220(4) or internal contacts 320(1) . . . 320(4).

Figure 4:
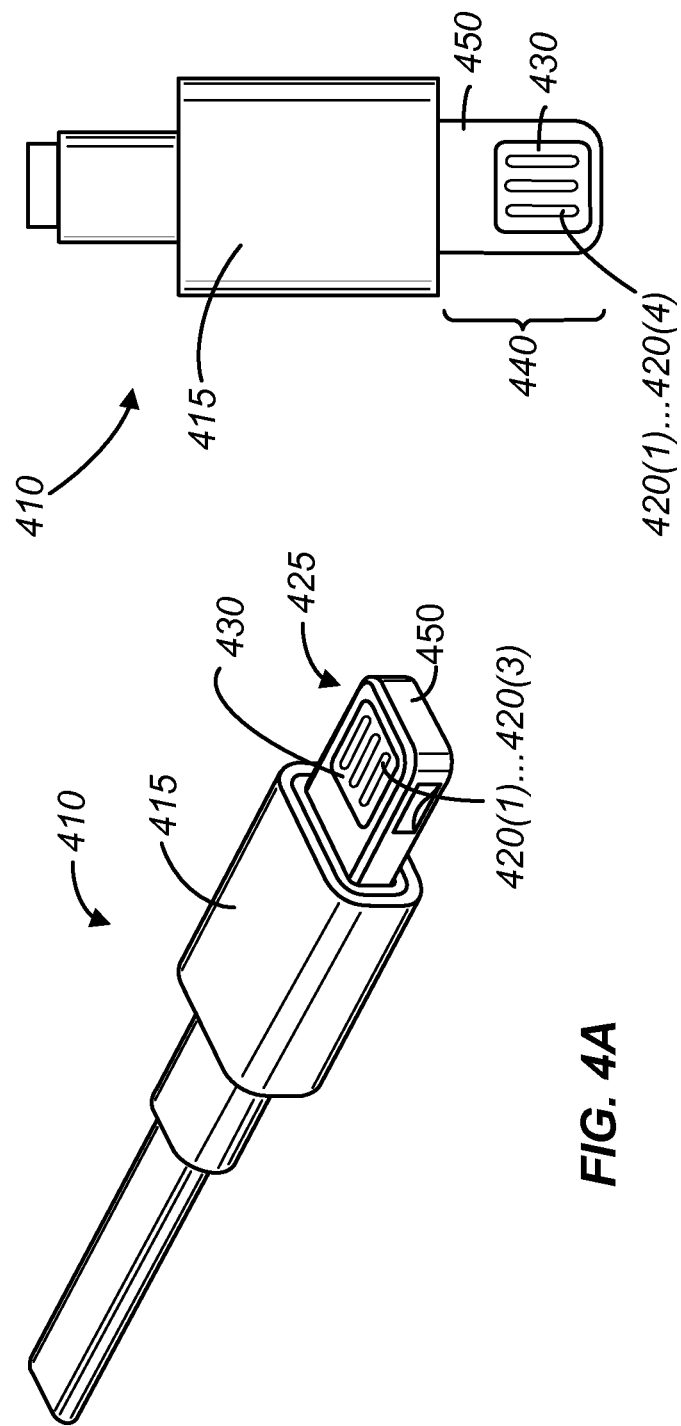
FIG. 4A is a diagram that illustrates an example of a connector plug with external contacts.
FIG. 4B is a diagram that illustrates an example of a connector plug with external contacts.

As another example of an embodiment of the invention, reference is made to FIGS. 4A and 4B, which show perspective and plan views, respectively, of a plug connector 410 that includes a plurality of external contacts. As shown in FIG. 4A, plug connector 410 includes a body 415 and a connector tab 425 that is sized to be inserted into a cavity in a corresponding receptacle connector (not shown). Tab 425 includes a metal ground ring 450 that surrounds a plurality of external contacts 420(1) . . . 420(3) formed at a first surface of the connector within a contact region 430 that can be filled with an injection molding compound to surround the contacts. Contacts 420(1) . . . 420(3) are considered external contacts because they are disposed on the outside of the connector. These contacts are not formed within a cavity of the connector as are the contacts in FIGS. 2 and 3 and are readily visible to anyone looking at the connector. In contrast, the internal contacts 220(1) . . . 220(4) (see FIG. 2) and 320(1) . . . 320(4) (see FIG. 3) are disposed within a shell or other type of cavity such as employed in a USB connector.

Referring now to FIG. 4B, tab 425 has a tab length 440 which is the distance the tab extends longitudinally away from plug body 415. In this embodiment the size and shape of the tab is essentially defined by metal ground ring 450 and the plurality of external contacts may be substantially planar with the tab. The ground ring can be made, for example, from stainless steel, and coated with a metal plating. In some embodiments, it may be desirable to approximately match the color of the contacts with the color of the tab to make the plug more aesthetically appealing and thus each of metal ground ring 425 and contacts 420(1) . . . 420(3) may have a substantially silver color. In other embodiments a contrasting color between the tab and the contacts may be desirable.

Figure 5:
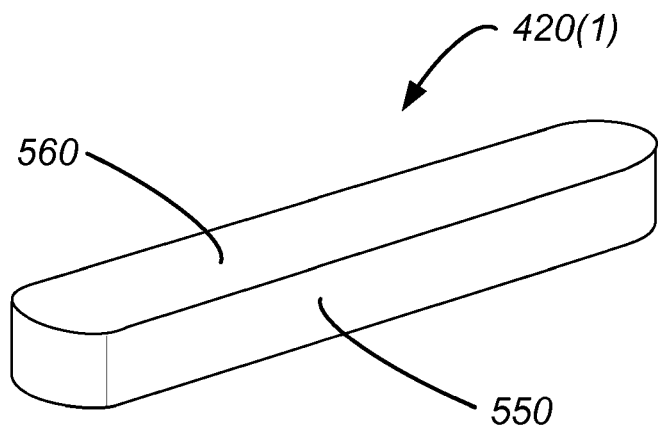
FIG. 5 is a diagram that illustrates a contact in accordance with an embodiment of the invention.
Figure 6:
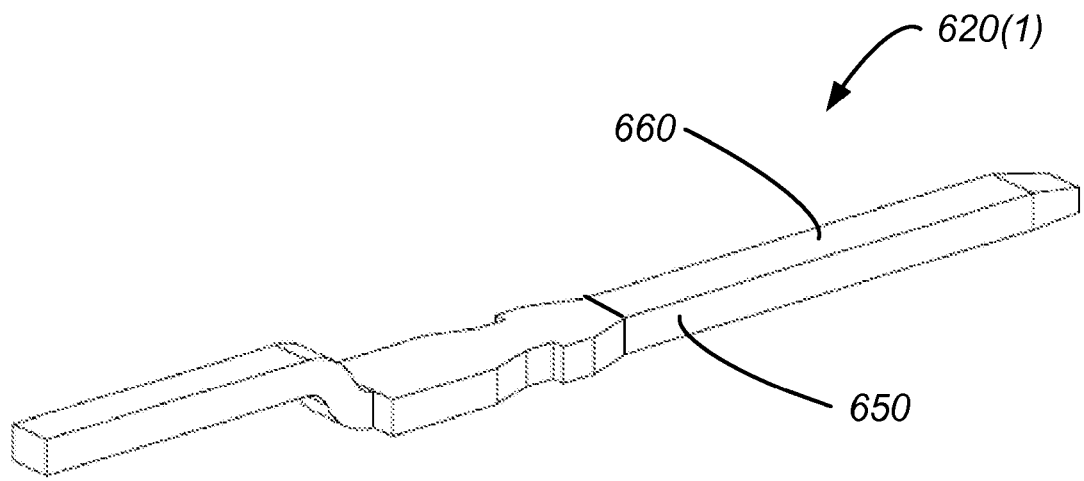
FIG. 6 is a diagram that illustrates a contact in accordance with an embodiment of the invention.

FIG. 5 shows a contact 420(1) from the connector 410 shown in FIGS. 4A and 4B. Each contact has a conductive base 550 and a contact surface 560. FIG. 6 shows another embodiment of a contact 620(1), which can be used in a connector different than connector 410, but also includes a conductive base 650 and a contact surface 660. Each of contacts 420(1) and 620(1) are designed to be wiping contacts that, during every mate and de-mate cycle, the contact of either the plug or the receptacle is forcibly pushed against the opposing contact during insertion and withdrawal of the plug. This results in a wiping action that helps break through any nonconductive surface corrosion and oxidation on the contact surface helping retain intimate metal-to-metal contact between the plug contacts and the receptacle contacts. Embodiments of the invention may also be employed in other contact designs and configurations, however, including blade contacts, switch contacts and others.

Figure 7:
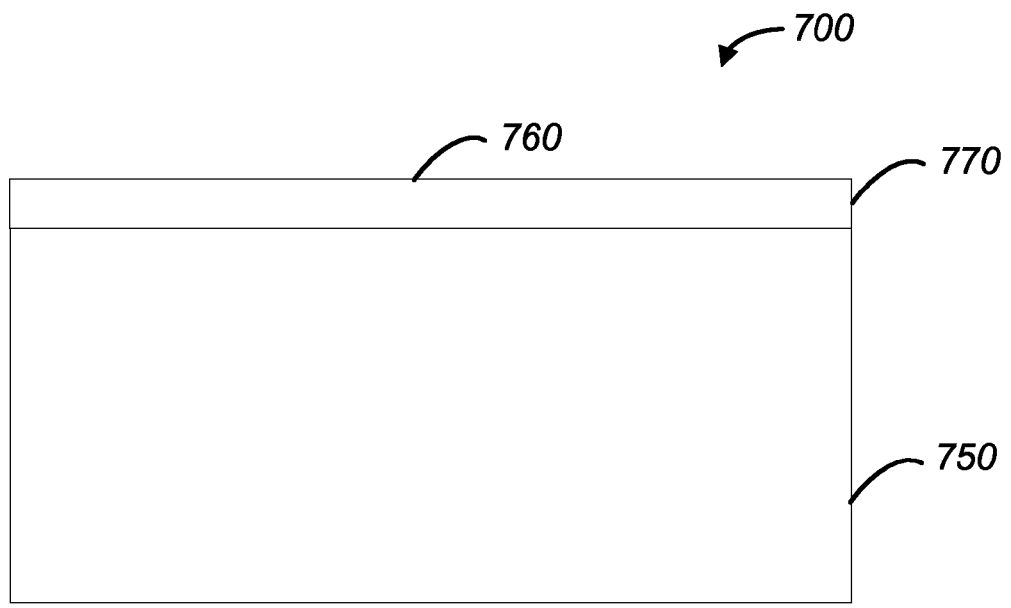
FIG. 7 is a diagram that illustrates a cross-sectional view of a contact in accordance with an embodiment of the invention.

FIG. 7 shows a cross-sectional view of an exemplary contact 700 according to the present invention such as contacts 420(1) and 620(1) depicted in FIGS. 5 and 6, respectively. Contact 700 includes a conductive base 750 that may be manufactured from copper or iron alloys, including brass and stainless steel. These alloys are preferred due to their low cost and high formability, however other conductive materials may readily be employed without departing from the invention. The contact surface 760 is paramount to the performance of the connector. The contact surface electrically and physically couples the signals between contacts in the plug connector and contacts in the receptacle connector. Thus, if anything precludes intimate metal-to-metal contact between the contact surfaces of the plug and the connector, the connector may not function properly.

More specifically, if the conductive base 750 is manufactured from metals which readily corrode or oxidize, it may be beneficial to plate the conductive base with a different metal that may be resistant to corrosion and oxidation to ensure intimate metal to metal contact between the contacts of the plug and the contacts of the receptacle. Some embodiments of the invention may plate the entire conductive base 750 with a Au/Pd binary metal alloy while other embodiments may plate only a portion of the contact surface of the conductive base. FIG. 7 shows a single outer layer of plating 770 on the contact surface 760 of the conductive base 750. In accordance with FIG. 7 it can be seen that in some embodiments, the conductive base may be much thicker than the outer layer.

Contact plating materials that are commonly used for the outer layer 770 are, for example, gold, silver and tin. A few considerations when selecting a material for the outer layer may be to: reduce the contact resistance between the plug and the receptacle, provide consistent contact resistance throughout numerous mating and de-mating cycles (durability and reliability), resist arc induced degradation and be aesthetically pleasing, among other factors. Each outer layer plating material has distinct advantages and disadvantages, thus careful consideration of the requirements for each application dictate the most suitable plating material. For example, gold is very resistant to oxidation and corrosion, however it is not typically very durable and is costly. Silver is somewhat less costly than gold, however it is prone to oxidation and tarnishes easily. Tin has a very low cost, however it is not as resistant to oxidation and corrosion as gold is. Further, gold has a very distinct color as compared to silver and tin, and may not be aesthetically pleasing in a particular application. The present invention solves many of the issues with existing plating technologies by offering a novel binary metal alloy for the outer layer 770, comprising gold and palladium.

In one embodiment the percent by weight of palladium in the binary metal alloy layer 770 is at least 10 percent, with the remainder in gold. Compositions that are approximately 10 percent by weight of palladium may exhibit a color that is more silver than pure gold, but not completely silver. In another embodiment the percent by weight of palladium in the binary metal alloy layer 770 is at least 15 percent, with the remainder in gold. In some embodiments the percent by weight of palladium in the binary metal alloy is between 15 to 50 percent, with the remainder in gold. Compositions that are greater approximately 15 percent by weight of palladium may exhibit a color that is uniformly silver with little or no noticeable gold color.

In one embodiment, depicted in FIG. 7, plated outer layer 770 has a thickness between 0.2-2.0 microns and the concentration of palladium and gold is substantially constant throughout the thickness of the layer.

Figure 8:
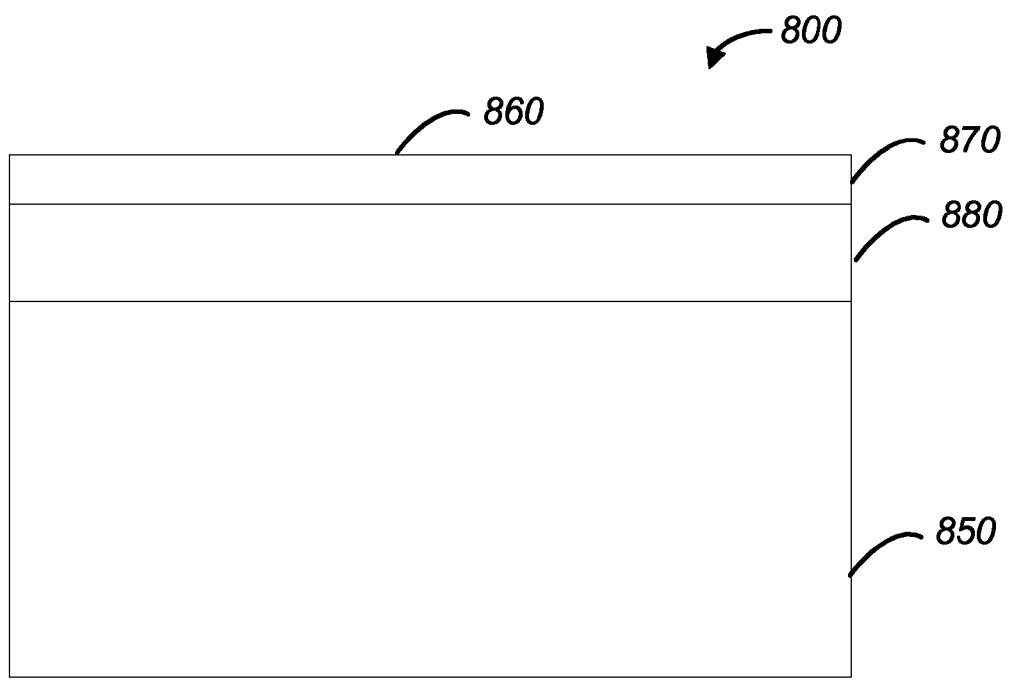
FIG. 8 is a diagram that illustrates a cross-sectional view of a contact in accordance with an embodiment of the invention.

In another embodiment, depicted in FIG. 8, there is an intermediate plating layer 880 disposed directly on the conductive base 850. An outer layer 870 of the binary metal alloy of gold and palladium, according to the present invention, is then plated on top of the intermediate layer such that the contact surface 860 is the binary metal alloy of gold and palladium.

In one embodiment, the intermediate layer 880 may be nickel or chrome, although other intermediate layer materials may be used without departing from the invention. Disposing one or more intermediate plating layers on the conductive base is often used as part of the contact preparation process in order to provide corrosion resistance and durability, among other features. For example, in some embodiments the outer plating layer may be selected to be more malleable than the intermediate layer. Increased malleability may promote greater contact area between the plug contacts and the receptacle contacts. However, the more malleable the outer layer material, the faster it may wear away with repeated mate and de-mate cycles. Thus, once the outer layer wears away, the intermediate layer may be the final barrier protecting the conductive base material from exposure. Therefore, in some embodiments, the intermediate layer may be selected from a harder group of materials than the outer surface layer. In some embodiments, the intermediate layer may also provide resistance to diffusion of the base layer material to the contact surface and promote adhesion of the outer layer.

In one embodiment the intermediate layer is predominantly nickel and has a thickness between 0.05-0.15 microns. In another embodiment the plated intermediate layer comprises a multi-layer nickel structure including a first strike layer, a second leveling nickel layer, a third sulfamate nickel layer and a top high-phosphorus nickel layer that has a higher hardness to reduce scratching. In one particular embodiment the leveling nickel layer is approximately 1 micron thick, the sulfamate nickel layer is approximately 1 micron thick and the high-phosphorous nickel layer is approximately 1 micron thick.

The intermediate and outer plating layers may be deposited with any practicable plating technology. For instance, electroplating is a widely used method for plating nickel. Electroplating may be performed by immersing the contact into an electrolyte solution and passing current through the plating solution. The contact may be used as a cathode, and when the nickel anode is being dissolved into the electrolyte, nickel ions traveling through the solution are deposited on the surface of the contact. A similar process may be employed for plating the metal alloy of gold and palladium. This is merely an example of a plating process that may be used, and myriad other plating processes may be used in further embodiments.

Electroless plating is another common method of plating and may be used for the intermediate and outer plating layers. For instance, electroless plating is a widely used method for plating Nickel. Electroless nickel plating is an auto-catalytic reaction used to deposit a coating of nickel on a substrate. Unlike electroplating, it is not necessary to pass an electric current through the solution to form a deposit. The process relies on the presence of a reducing agent, for example hydrated sodium hypophosphite, which reacts with the metal ions to deposit metal. This is merely an example of a plating process that may be used, and myriad other plating processes may be used in further embodiments.

Regardless of which plating technology is employed, the deposition of the gold and palladium is simultaneous. That is, both gold and palladium atoms are deposited on the contact at the same time while immersed in the plating solution to form a single layer of a binary metal alloy of gold and palladium having the weight percentages discussed above. In one embodiment, an electrolytic plating process may be used to deposit nickel as the intermediate layer and may also be used to deposit the binary metal alloy of gold and palladium as the outer layer. In another embodiment, an electroless plating process may be used to deposit nickel as the intermediate layer and may also be used to deposit the binary metal alloy of gold and palladium as the outer layer. In still another embodiment, an electrolytic plating process may be used to deposit either the intermediate layer or the outer layer and an electroless plating process may be used to deposit the other layer.

The purity and/or composition of the binary metal alloy of gold and palladium may be modified to change the characteristics of the alloy. For instance, certain impurities may be added to the alloy and/or the percent composition of palladium may be increased to improve the wear resistance and durability of the outer layer. In some embodiments impurities such as, for example, nickel and chrome may be used for this purpose. Other impurities are known to those of skill in the art and may be employed without departing from the invention. Further, in some embodiments the percent composition of palladium in the binary alloy may be increased to improve the hardness of the outer layer, as palladium is harder than gold.

However, in some embodiments there may be deleterious effects when adding such impurities or increasing the percent composition of palladium in the alloy. For example, the hardness of the outer layer may increase which may result in an increase in contact resistance. Conversely, in some embodiments it may be desirable to make the alloy of gold and palladium as pure as possible or with a very small percent composition of palladium. This may result in the opposite effect of making the material more malleable and improving its electrical conductivity and contact resistance. Further embodiments may employ various types and concentrations of impurities and various percent compositions of palladium to have an effect on the color of the outer layer, which may be a consideration for aesthetic appeal.

In one embodiment, the metal alloy of gold and palladium is at least 99 percent pure with 1 percent or less of other elements. In some embodiments, the Au/Pd metal alloy is at least 99.9 percent pure with 0.1 percent or less of other elements, and in still other embodiments the Au/Pd metal alloy is at least 99.99 percent pure with 0.01 percent or less of other elements.

As mentioned above, the plating may be applied on all surfaces of the conductive base of the contact, or may be selectively applied. Selective application of the outer layer may be preferable when the costs of the plating material are high and the contact surface is easily masked during the plating process. In one embodiment, the intermediate layer may be applied to all surfaces of the conductive base of the contact and the outer layer may also be applied to all surfaces of the conductive base. In another embodiment the intermediate layer may be applied to all surfaces of the conductive base of the contact and the outer layer may be selectively applied to only the contact surface of the conductive base. In yet another embodiment the intermediate layer and the outer layer may be selectively applied to only the contact surface of the conductive base.

Figure 9:
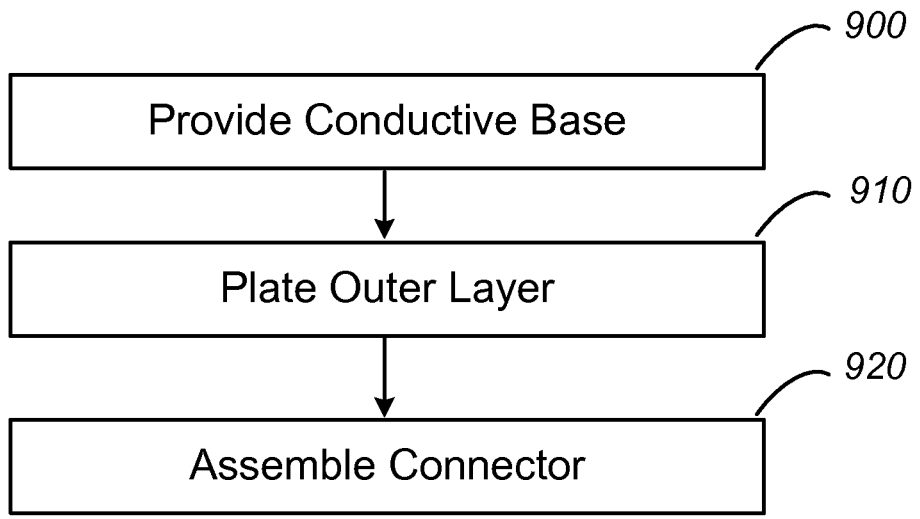
FIG. 9 is a process by which a connector in accordance with an embodiment of the invention can be manufactured.

FIG. 9 illustrates a simplified process for manufacturing a connector in accordance with embodiments described herein. In step 900 a conductive base for a contact is supplied. The conductive base may be supplied as a strip of bulk material so it may be processed from reels, or it may be supplied as a bulk panel. The conductive base material may further have been processed at this step such as by a blanking operation or chemical etching process. In step 910 the outer layer, comprising a binary metal alloy of gold and palladium, is plated on the contact. As mentioned supra, the outer layer may be applied to all surfaces of the conductive base, or may be selectively applied to only the contact surface. In step 920 the contact is assembled into the connector wherein the contact surface of the connector contacts comprises a metal alloy of gold and palladium. This step may include the formation of the contact and singulation from the bulk conductive base material. The connector assembly is then completed.

Figure 10:
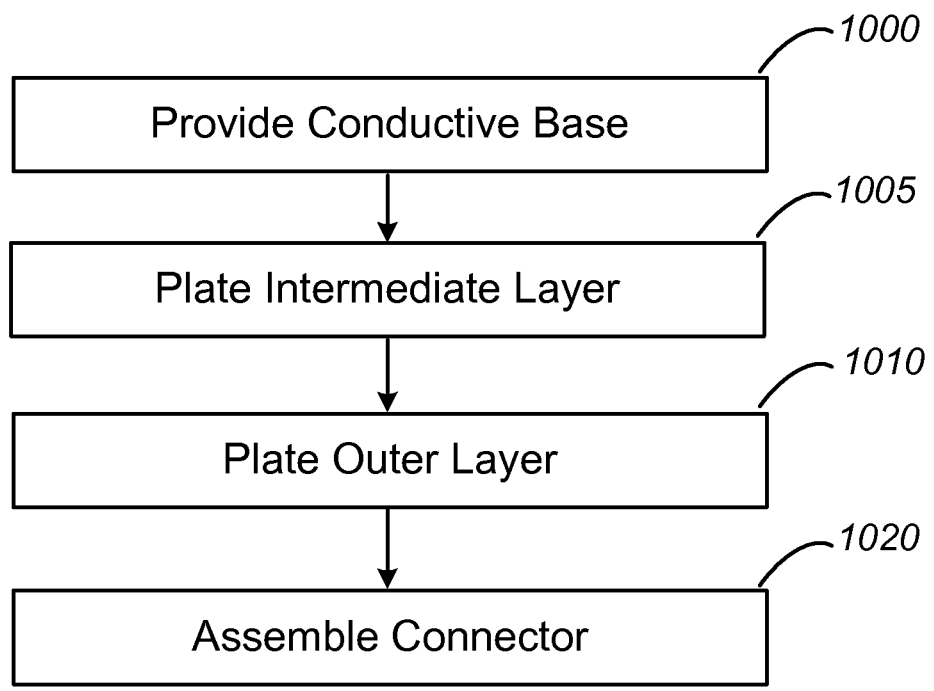
FIG. 10 is a process by which a connector in accordance with an embodiment of the invention can be manufactured.

FIG. 10 illustrates a simplified process for manufacturing a connector in accordance with embodiments described herein. In step 1000 a conductive base is supplied. The conductive base may be supplied as a bulk strip of material so it may be processed from reels, or it may be supplied as a bulk panel. The conductive base material may further have been processed at this step such as by a blanking operation or chemical etching process. In step 1005 the intermediate layer is plated on the contact. As mentioned supra, the intermediate layer may be applied to all surfaces of the conductive base, or may be selectively applied to only the contact surface. In step 1010 the outer layer comprising a binary metal alloy of gold and palladium is plated on the contact. As mentioned supra, the outer layer may be applied to all surfaces of the conductive base, or may be selectively applied to only the contact surface. In step 1020 the contact is assembled into the connector wherein the contact surface of the connector contacts comprises a metal alloy of gold and palladium. This step may include the formation of the contact and singulation from the bulk conductive base material. The connector assembly is then completed.

Figure 11A:
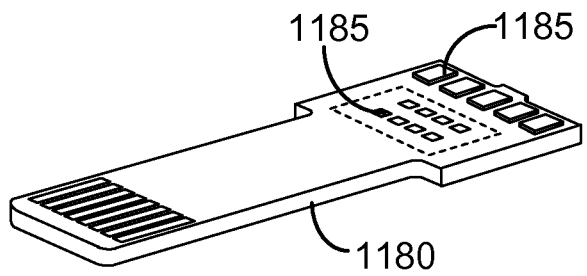
FIG. 11A is a diagram that illustrates an example of a connector contact interface board.
Figure 11B:
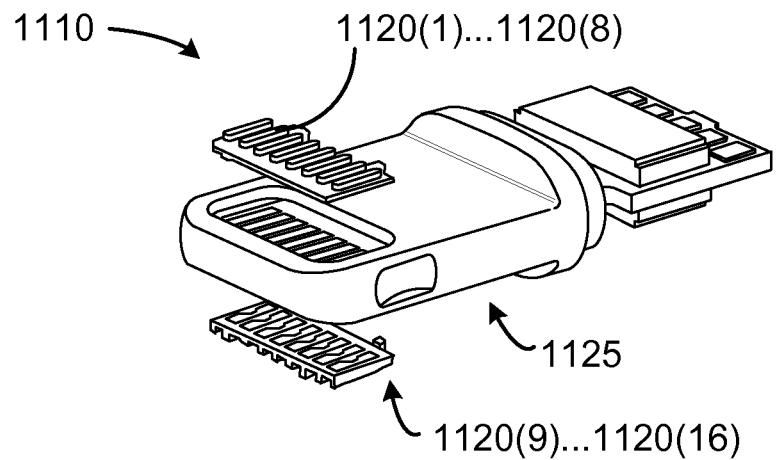
FIG. 11B is a diagram that illustrates an example of a partially assembled connector plug with two sets of external contacts.
Figure 11C:
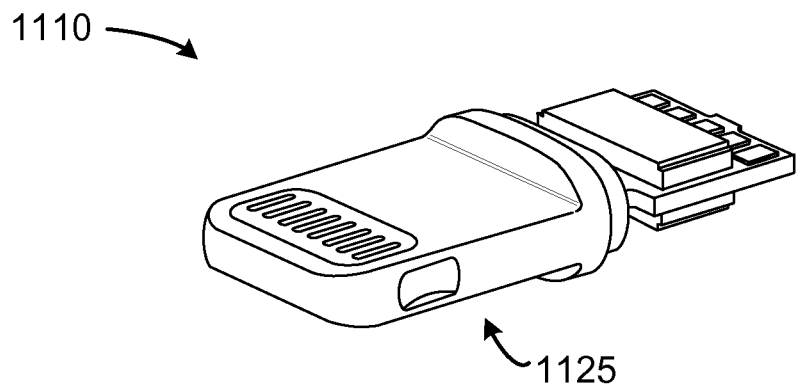
FIG. 11C is a diagram that illustrates an example of a connector plug with two sets of external contacts.

FIGS. 11A through 11C are simplified top perspective views of the assembly of a connector plug 1110 according to an embodiment of the invention. Connector 1110 includes many of the same features as plug connector 400 (see FIG. 4) including a tab 1125 which may be made out of stamped metal. Connector 1110 has eight contacts 1120(1) ... 1120(8) positioned on the top surface of the connector tab and an additional eight contacts 1120(9) ... 1120(16) positioned on the opposing bottom surface of tab 1125. The connector plug is designed to be inserted into a corresponding receptacle connector.

FIG. 11A depicts a contact interface board 1180 which may be a printed circuit board, a ceramic substrate, or other similar material known to those of skill in the art. The contact interface board electrically connects the contacts 1120(1) ... 1120(16) to the cable 100 (see FIG. 1). As illustrated in FIG. 11B, the contacts may be soldered to the contact interface board to improve the reliability of the assembly. The interface board can also contain passive and active circuitry 1185 for aiding the communication between devices. In this embodiment the contact interface board is sandwiched between two pluralities of contacts and the base of each contact is electrically connected to the interface board. The completed connector 1110 is illustrated in FIG. 11C. The contacts are manufactured in accordance with the embodiments described herein wherein the outside layer is plated with binary metal alloy of gold and palladium. The outside layer may be configured to approximately match the color of the metal tab 1125.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. An electrical connector comprising:
   a body; and
   a plurality of contacts carried by the body, each contact including a conductive base having a binary metal alloy plated layer at an outer surface of each contact, the binary metal alloy plated layer comprising gold and palladium;
   wherein the weight percentage of palladium in the binary metal alloy plated layer is at least 10 percent, with the remainder in gold.

2. The electrical connector set forth in claim 1 wherein the weight percentage of palladium in the binary metal alloy plated layer is between 15-50 percent, with the remainder in gold.

3. The electrical connector set forth in claim 1 wherein a concentration of palladium and a concentration of gold is substantially constant throughout a thickness of the binary metal alloy plated layer.

4. The electrical connector set forth in claim 1 wherein the binary metal alloy plated layer is between 0.2-2.0 microns thick.

5. The electrical connector set forth in claim 1 wherein the conductive base in each of the plurality of contacts comprises a copper alloy or stainless steel.

6. The electrical connector set forth in claim 1 wherein each of the plurality of contacts includes an intermediate layer disposed between the conductive base and the binary metal alloy plated layer.

7. The electrical connector set forth in claim 6 wherein the intermediate layer comprises nickel.

8. The electrical connector set forth in claim 1 wherein the plurality of contacts are external contacts.

9. The electrical connector set forth in claim 8 wherein the body includes a tab extending longitudinally away from a base portion and the plurality of external contacts are positioned at an outer surface of the tab.

10. The electrical connector set forth in claim 8 wherein the plurality of external contacts include a first plurality of contacts positioned at a first outer surface of the tab and a second plurality of contacts positioned at a second outer surface of the tab opposite the first outer surface.

11. The electrical connector of claim 1 wherein a color of the binary metal alloy plated layer comprising gold and palladium is more silver than gold.

12. An electrical connector comprising:
one or more contacts, wherein each contact comprises a conductive base; and
the conductive base comprising a contact surface and one or more surface layers disposed on the contact surface;
wherein an outermost surface layer comprises gold and palladium; and
wherein the weight percentage of palladium in the outermost surface layer is at least 10 percent, with the remainder in gold.

13. The electrical connector set forth in claim 12 wherein the weight percentage of palladium in the outermost surface layer is between 15-50 percent, with the remainder in gold.

14. The electrical connector set forth in claim 12 wherein a concentration of palladium and a concentration of gold is substantially constant throughout a thickness of the outermost surface layer.

15. The electrical connector set forth in claim 12 wherein the outermost surface layer is between 0.2-2.0 microns thick.

16. The electrical connector set forth in claim 12 wherein the conductive base in each of the one or more contacts comprises a copper alloy or stainless steel.

17. The electrical connector set forth in claim 12 wherein each of the plurality of contacts includes an intermediate layer disposed between the conductive base and the outermost surface layer.

18. The electrical connector set forth in claim 17 wherein the intermediate layer comprises nickel.

19. The electrical connector of claim 12 wherein a color of the outermost surface layer comprising gold and palladium is more silver than gold.

20. A method of making an electrical connector comprising:
forming a connector body;
forming one or more contacts from a conductive base material;
plating at least a portion of the one or more contacts with one or more surface layers; and
assembling the one or more contacts to the connector body;
wherein an outermost surface layer comprises an alloy of gold and palladium; and
wherein the weight percentage of palladium in the outermost surface layer is at least 10 percent, with the remainder in gold.

21. A method of making an electrical connector comprising:
forming one or more contacts from a conductive base material;
plating at least a portion of the one or more contacts with one or more surface layers;
wherein an outermost surface layer comprises an alloy of gold and palladium;
forming an interface board;
attaching the one or more contacts to the interface board; and
attaching a cable to the interface board;
wherein the weight percentage of palladium in the outermost surface layer is at least 10 percent, with the remainder in gold.

22. An electrical connector comprising:
one or more contacts, wherein each contact comprises a conductive base having an outermost surface layer including an alloy of gold and palladium;
an interface board; and
a cable;
wherein the one or more contacts and the cable are electrically attached to the interface board; and
wherein the weight percentage of palladium in the outermost surface layer is at least 10 percent, with the remainder in gold.

* * * * *